June 2, 1964 H. F. MALONE ETAL 3,135,848
CONVENIENCE OUTLET AND CIRCUIT BREAKER DEVICE
Filed Nov. 21, 1960 2 Sheets-Sheet 2
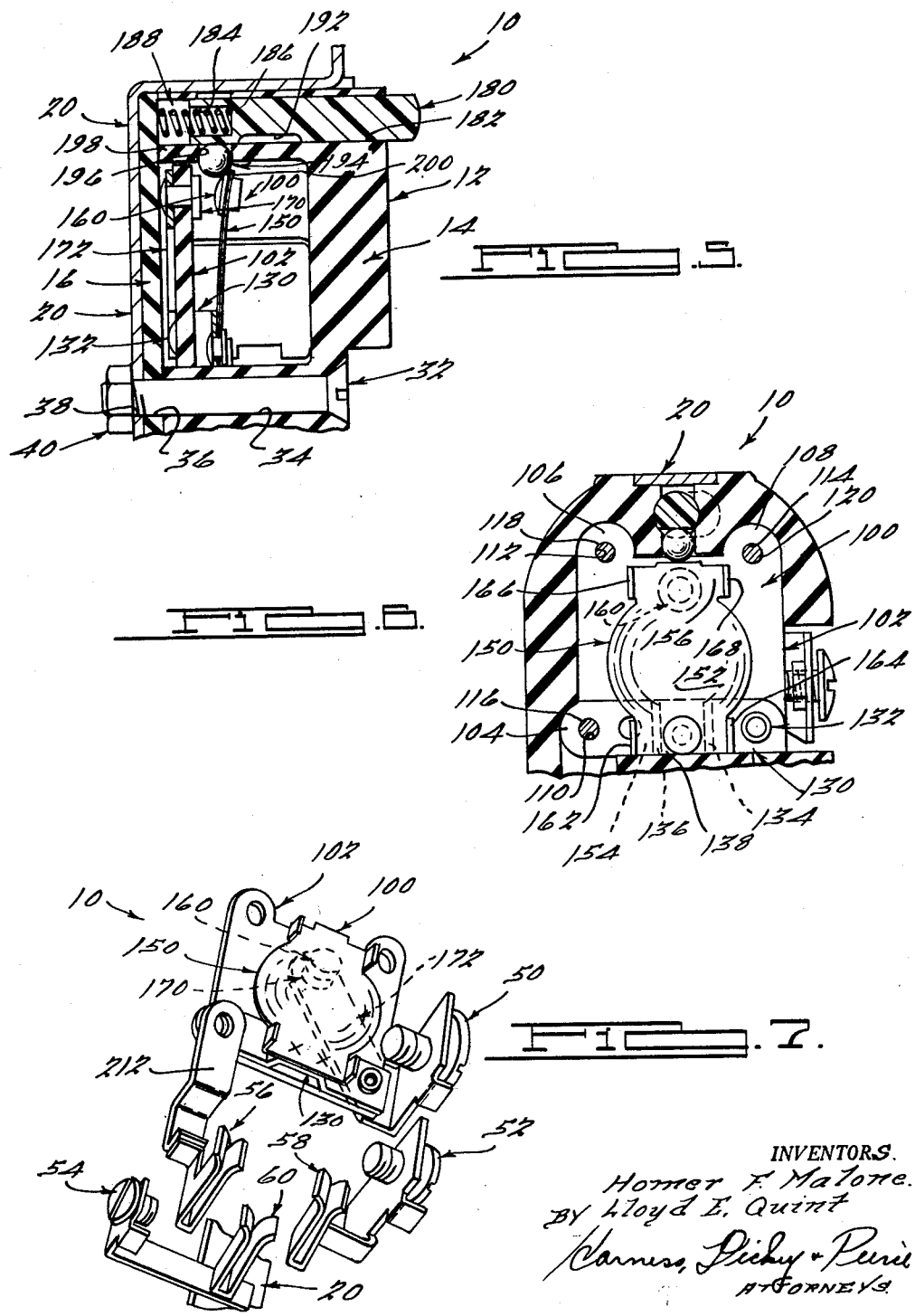
INVENTORS.
Homer F. Malone.
BY Lloyd L. Quint
Carness, Dickey & Pierce.
ATTORNEYS United States Patent Office 3,135,848
Patented June 2, 1964

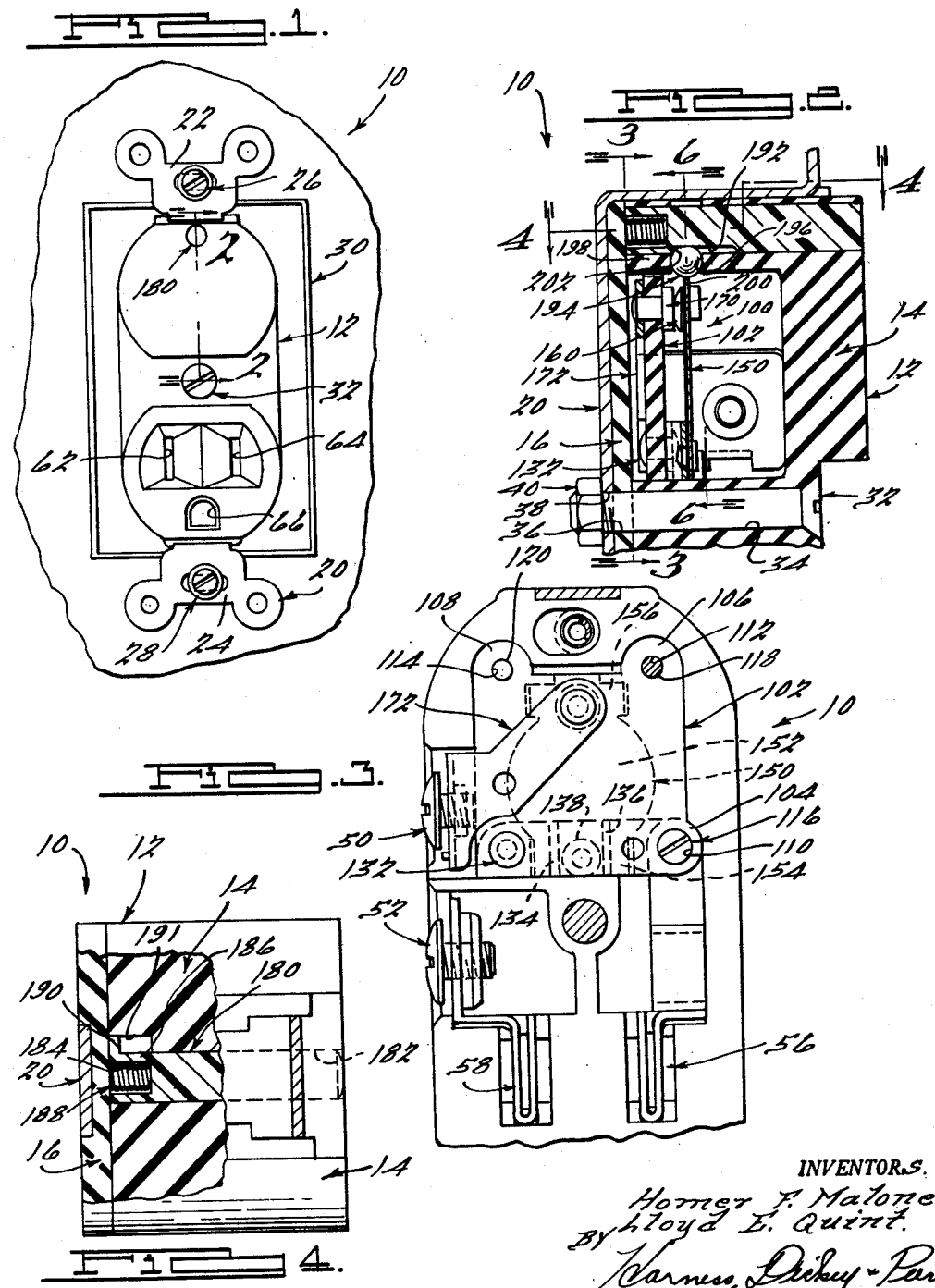

3,135,848
CONVENIENCE OUTLET AND CIRCUIT
BREAKER DEVICE
Homer F. Malone and Lloyd E. Quint, Jackson, Mich.,
assignors to Mechanical Products, Inc., Jackson, Mich.,
a corporation of Delaware
Filed Nov. 21, 1960, Ser. No. 70,603
1 Claim. (Cl. 200—115.5)

This invention relates generally to electrical apparatus and more particularly to a combination duplex convenience outlet and circuit breaker.

Most modern electrical systems are provided with branch circuit protection at the electrical service entrance in the form of one or more circuit breakers or fuses that isolate any branch circuit having an overload or short circuit condition from the exterior power line. However, such branch circuit protection devices must of necessity have a current rating sufficient to feed the entire branch circuit. Also, an overload or short circuit condition in any one of a number of electrically operated devices supplied by the branch circuit effects tripping of the branch circuit protection device and deenergization of the entire branch circuit. Therefore, conventional branch circuit protection devices have proved to be inadequate when closely calibrated overload protection is required for a particular device or when it is undesirable to have the entire branch circuit deenergized upon the occurrence of an overload therein.

The present invention is directed to a novel duplex convenience outlet having a circuit breaker integrally housed therein that is closely calibrated to the current rating of an electrically operated device connected thereto whereby, upon the occurrence of an overload or short circuit condition in the electrically operated device, the circuit breaker deenergizes the electrically operated device without disabling the entire branch circuit. Thus, each electrically operated device is individually protected at the point of connection thereof to the branch circuit. It is to be noted that protection of the branch circuit at the service entrance is in no way disabled by use of the duplex convenience outlet of the present invention.

Accordingly, one object of the present invention is a duplex convenience outlet and circuit breaker.

Another object is a duplex convenience outlet and circuit breaker when the circuit breaker has a snap-acting thermal responsive member.

Another object is a circuit breaker for a duplex convenience outlet that is maintained in the open condition until manually reset upon tripping thereof.

Another object is a duplex convenience outlet and circuit breaker wherein the circuit breaker is trip-free in operation.

Another object is a duplex convenience outlet and circuit breaker wherein visual indication is given of the condition of the circuit breaker.

Another object is a circuit breaker adapted to be closely calibrated to an electrical appliance and including means for interconnection of said circuit breaker and said appliance to a source of electrical energy.

Other objects and advantages of the present invention will be apparent in the following specification, claims and drawings wherein:

FIGURE 1 is a front view of a duplex convenience outlet and circuit breaker in accordance with an exemplary embodiment of the present invention shown operatively mounted in a conventional receptacle;

FIG. 2 is a cross sectional view taken substantially along the line 2—2 of FIGURE 1;

FIG. 3 is a cross sectional view taken substantially along the line 3—3 of FIG. 2;

FIG. 4 is a fragmentary cross sectional view taken substantially along the line 4—4 of FIG. 2;

FIG. 5 is a view similar to FIG. 2 showing the circuit breaker and manual operator thereof in the open condition;

FIG. 6 is a cross sectional view taken substantially along the line 6—6 of FIG. 2;

FIG. 7 is a fragmentary perspective view of the electrically energized components of the duplex receptacle and circuit breaker.

A duplex convenience outlet and circuit breaker 10, in accordance with an exemplary embodiment of the present invention, comprises a housing 12 of, for example, molded Bakelite. The housing 12 comprises a base member 14 and a cover plate 16 that are mutually complementary and cooperate to support and enclose the electrically energized components of the duplex convenience outlet and circuit breaker 10. A supporting and grounding strap 20 is mounted behind the cover plate 16 and has ears 22 and 24 thereon for the acceptance of suitable screws 26 and 28 that position and support the duplex receptacle 10 with respect to a conventional junction box 30.

The strap 20 and cover plate 16 are maintained in position with respect to the base portion 14 of the housing 12 by a transversely extending screw 32 that extends through suitable apertures 34, 36 and 38 in the base 14, cover 16 and strap 20 for engagement with a complementary nut 40.

As best seen in FIGS. 3 and 7, the duplex receptacle 10 is provided with conventional screw terminals 50 and 52 for the connection of wires from opposite sides of a source of electrical energy, (not shown), a screw terminal 54 (FIG. 7) providing for connection of a ground wire (not shown) to the grounding strap 20. The terminals 50, 52 and 54 are connected to conventional spring jaws 56, 58 and 60, respectively, that accept the contact blades of a conventional cord plug (not shown). The spring jaws 56, 58 and 60 are aligned with suitable apertures 62, 64 and 66, respectively, in the base portion 14 of the housing 12 for the acceptance of the contact blades of the cord plug.

In accordance with the present invention, electrical continuity between the terminal 50 and the jaw 56 is interrupted upon the occurrence of predetermined conditions in the electrical circuit, by a circuit breaker designated generally by the numeral 100.

As best seen in FIG. 6, the circuit breaker 100 is supported on an insulating plate 102 having a plurality of ears 104, 106 and 108 with apertures 110, 112 and 114 therein, respectively, for the acceptance of a retaining screw 116 and a pair of upstanding locater posts 118 and 120 on the base section 14 of the housing 12.

The plate 102 has a blade support bracket 130 secured thereto as by a rivet 132 and the screw 116. The bracket 130 is of generally U-shaped transverse section defined by upstanding leg portions 134 and 136 with a bight portion 138 therebetween.

The bight portion 138 of the bracket 130 supports a snap-acting bimetallic blade 150 that is secured to the bracket 130 as by welding. The blade 150 has a nondevelopable or dished center portion 152 of generally circular configuration with ears 154 and 156 at the opposite ends thereof for attachment to the bracket 130 and for the support of a movable contact 160, respectively. The ears 154 and 156 have generally normally folded edge flanges 162, 164, 166 and 168 at opposite sides thereof, respectively, to stiffen the ears 154 and 156 thereby to improve snap-action of the bimetal 150 upon heating and cooling thereof.

The movable contact 160 is aligned with a fixed contact 170 that is supported by the plate 102 and electrically connected to the terminal 50 by a conductive member 172. Therefore, heating of the bimetallic blade 150 due to an overload or short circuit condition in a device connected to the duplex outlet 10 effects separation of the contacts 160 and 170 thereby to interrupt electrical continuity between the terminal 50 and jaw 56.

As best seen in FIGS. 2, 3, 4, 5, and 6, a manual operator 180 is mounted for slidable movement in a bore 182 in the base 14. The manual operator 180 has a bore 184 in an end portion 186 thereof for the acceptance of a helical compression spring 188 that is seated against the cover 16 thereby to normally bias the manual operator outwardly of the bore 182. The end portion 186 of the manual operator 180 has a finger 190 that is slidable in a complementary groove 191 thereby to preclude rotation of the manual operator 180 in the bore 184.

As best seen in FIGS. 2, 5 and 6, the manual operator 180 has a longitudinally extending recess 192 thereon for the acceptance, in one condition, of a laterally movable ball 194. The ball 194 is of insulating material, for example glass, and is supported and retained in a transverse aperture 196 in an extending wall 198 of the base 14.

As best seen by comparing FIGS. 2 and 5, the ball 194 is restrained or held within the aperture 196 due to engagement thereof with an outer end portion 200 of the blade 150 and with the seat of the groove 192 in the manual operator 180. The manual operator 180 is also restrained against outward movement under the bias of the helical compression spring 188 by engagement of a shoulder 202 at the end of the groove 192 with the ball 194.

Movement of the end portion 200 of the blade 150 to the right, as seen in FIG. 5, permits the ball 194 to move outwardly of the aperture 196 in the wall 198 thereby relieving engagement of the shoulder 202 on the manual operator 180 with the ball 194 and permitting the manual operator 180 to move outwardly of the bore 182 to the trip indicating position shown in FIG. 5. The ball 194 in this condition is restrained from inward movement by the end portion 196 of the manual operator 180 thereby precluding closing of the movable contact 160 against the fixed contact 170. It is to be noted, however, that the diameter of the ball 194 is so calculated that the blade 150 maintains a bias thereupon upon cooling, or, in other words, the bimetal 150 initiates its snap-action movement to the contacts' closed condition upon cooling and is restrained from such movement by engagement of the ball 194 between the end portion 200 thereof and the wall of the aperture 196 in the side wall 198 of the base 14.

Closure of the separable contacts 160 and 170 is effected by inward movement of the manual operator 180 against the bias of the spring 188 permitting the ball 194 to move through the aperture 196 in the base 14 into the recess 192 in the manual operator 180 under the bias of the snap-acting blade 150 as it moves to the contacts' closed position.

As best seen in FIG. 7, electrical continuity through the convenience outlet and circuit breaker 10, when the separable contacts 160 and 170 are in the closed condition, is from the terminal 50, through the conductive member 172 to which the fixed contact 170 is affixed as by soldering, through the fixed and movable contacts 170 and 160, respectively, through the bimetallic member 150 thence to the mounting bracket 130, thence to a connecting strap 212 and spring jaw terminal 56. The other side of the line is directly connected from the terminal 52 to the spring jaw clip 58.

From the foregoing description, it should be obvious that the improved duplex convenience outlet and circuit breaker is adapted to be electrically connected to a branch electrical circuit so as to provide for interruption of the electrical circuit to an appliance or electrically operated device connected thereto upon the occurrence of an overload or short circuit condition in the device without interrupting electrical service to other electrically operated devices fed by the branch circuit. The circuit breaker within the convenience outlet is preferably closely calibrated to the current rating of the electrically operated device connected to the duplex outlet to maximize the protection thereof. The circuit breaker is maintained in the tripped condition by a novel lock-out mechanism that permits snap-action of the separable contacts to both the contacts' closed and contacts' open conditions, yet is trip-free in operation.

It is to be understood that the specific construction of the improved convenience outlet and circuit breaker device herein disclosed and described is presented for the purpose of explanation and illustration and is not intended to indicate limits of the invention, the scope of which is defined by the following claim.

What is claimed is:

A circuit breaker for interrupting an electrical circuit upon the occurrence of predetermined electrical conditions therein, said circuit breaker comprising an insulating base, a fixed contact on said base electrically connected to one side of said electrical circuit, a snap-acting bimetallic blade having a movable contact thereon engageable with said fixed contact and electrically connected to the other side of said electrical circuit, said blade being movable in one direction in response to said predetermined condition to effect separation of said contacts, and means for holding said contacts in the open condition upon movement of said blade to the contacts' open condition comprising an insulating ball supported for movement between a contact's open position under said blade and a contact's closed position, a slidable member normally biasing said ball against said blade and movable in said one direction from a contact's closed condition to a contact's open condition, said slidable means having a bore at one end thereof, resilient means in the bore of said slidable means engaging said base for normally biasing said slidable member and ball in said one direction to the contacts' open condition, said slidable member having a recess for the acceptance of said ball when said blade is in the contacts' closed condition, movement of said blade to the contacts' open condition freeing said ball for movement out of the recess in said slidable member thereby to free said slidable member for movement in said one direction to the contacts' open position under the bias of said resilient means, movement of said slidable member to the contacts' open condition moving the recess therein out of alignment with said ball thereby holding said ball and bimetallic blade in the contacts' open position, said ball being of a diameter such that said blade moves to the contacts' closed condition with a snap-action upon movement of said slidable member to the contacts' closed condition.

References Cited in the file of this patent

UNITED STATES PATENTS

| | | |
|---|---|---|
| 2,242,232 | Cappelle | May 20, 1941 |
| 2,743,333 | Epstein | Apr. 24, 1956 |
| 2,755,357 | Taylor | July 17, 1956 |
| 2,856,487 | Mang | Oct. 14, 1958 |
| 2,863,965 | Cardin et al. | Dec. 9, 1958 |
| 2,901,575 | Clarke | Aug. 25, 1959 |
| 2,943,623 | Christensen | Apr. 26, 1960 |